(12) United States Patent
Venkatraman et al.

(10) Patent No.: US 9,154,917 B2
(45) Date of Patent: Oct. 6, 2015

(54) METHOD AND APPARATUS FOR GEOTAGGING

(71) Applicant: QUALCOMM Incorporated, San Diego, CA (US)

(72) Inventors: Sai Pradeep Venkatraman, Santa Clara, CA (US); Weihua Gao, San Jose, CA (US); Amir A. Emadzadeh, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 13/799,470

(22) Filed: Mar. 13, 2013

(65) Prior Publication Data

US 2014/0274161 A1    Sep. 18, 2014

(51) Int. Cl.
| | |
|---|---|
| H04W 24/00 | (2009.01) |
| H04W 4/02 | (2009.01) |
| G01C 21/20 | (2006.01) |
| G01S 5/02 | (2010.01) |
| H04W 4/00 | (2009.01) |

(52) U.S. Cl.
CPC .............. *H04W 4/025* (2013.01); *G01C 21/20* (2013.01); *G01C 21/206* (2013.01); *G01S 5/02* (2013.01); *H04W 4/006* (2013.01)

(58) Field of Classification Search
CPC ......... H04W 64/00; H04W 4/02; H04W 4/04; H04W 4/026; H04W 4/027; H04W 8/18
USPC .......................... 455/456.1, 456.6, 457, 414.2
See application file for complete search history.

(56) References Cited

U.S. PATENT DOCUMENTS

| | | | |
|---|---|---|---|
| 7,657,266 B2 * | 2/2010 | Kennedy et al. ............ | 455/456.2 |
| 8,280,405 B2 * | 10/2012 | Sanz-Pastor et al. ....... | 455/456.2 |
| 2009/0222482 A1 | 9/2009 | Klassen et al. | |
| 2009/0280824 A1 | 11/2009 | Rautiainen | |
| 2010/0076968 A1 * | 3/2010 | Boyns et al. .................. | 707/732 |
| 2011/0035284 A1 | 2/2011 | Moshfegh | |
| 2011/0111772 A1 | 5/2011 | Tysowski | |
| 2011/0181470 A1 | 7/2011 | Qiu et al. | |
| 2013/0102328 A1 * | 4/2013 | Kalofonos et al. ......... | 455/456.2 |
| 2013/0337830 A1 * | 12/2013 | Haro et al. ................. | 455/456.1 |

* cited by examiner

*Primary Examiner* — Temica M Beamer
(74) *Attorney, Agent, or Firm* — Kilpatrick Towsend Stockton LLP

(57) ABSTRACT

Methods and apparatuses for performing geotagging referencing in both indoor and outdoor environments are presented. In some embodiments, a mobile device may record a digital media object comprising at least one digitally recorded event of a surrounding environment of the mobile device. The mobile device may obtain at least one geotagging datum, the at least one geotagging datum comprising at least one timing measurement from at least one reference source. The mobile device may determine a location of the digital media object using the at least one geotagging datum. The mobile device may then label the digital media object with the location of the digital media object.

40 Claims, 8 Drawing Sheets

METHOD AND APPARATUS FOR GEOTAGGING

BACKGROUND

Geotagging is a media-recording process that is becoming more common to consumers in the digital age. In some cases, geotagging presents merely additional information that can help describe the context of the recorded media. In other cases, geotagging may present convenient and important information that might be otherwise difficult to convey or tie to the recorded media. As geotagging becomes more widespread, it may be desirable to increase the capabilities and functionality of geotagging to be more useful and convenient for consumers.

SUMMARY

These problems and others may be solved according to various embodiments, described herein.

In some embodiments, a method of a mobile device is presented. The method may include recording at the mobile device a digital media object associated with a surrounding environment of the mobile device. The method may also include obtaining at the mobile device at least one geotagging datum, the at least one geotagging datum comprising at least one timing measurement from at least one reference source. The method may also include determining a location of the digital media object using the at least one geotagging datum, and labeling the digital media object with the location of the digital media object.

In some embodiments, the mobile device may be capable of determining the location of the digital media object by using the at least one geotagging datum while the mobile device is at a location different than the location of where the digital media object was recorded.

In some embodiments, obtaining the at least one geotagging datum may include recording the at least one timing measurement from an access point (AP) in range of and identifiable to the mobile device at the time of the recording of the digital media object. In some embodiments, the at least one timing measurement comprises WiFi received signal strength indicator (RSSI) measurements or round trip time (RTT) measurements. In some embodiments, the reference source may include an access point (AP), a base station, or a satellite.

In some embodiments, the method may also include obtaining at least one sensor measurement at the mobile device, and labeling the digital media object further with the at least one sensor measurement. In some embodiments, the at least one sensor measurement may include an accelerometer measurement, a gyro measurement, a Bluetooth measurement, a WiMax measurement, an NFC reading, a barometer measurement, a proximity sensor measurement, an ambient light sensor measurement, a compass measurement, a back-illuminated sensor measurement, a magnetic sensor measurement, or a cellular measurement from the mobile device.

In some embodiments, the media data object may include a plurality of digitally recorded events, and the at least one geotagging datum may include a plurality of geotagging data. The plurality of geotagging data may include a plurality of timing measurements from at least one reference source, wherein each of the plurality of timing measurements is associated with a time at which one of the plurality of digitally recorded events was recorded. The method may also include determining a location for each of the plurality of digitally recorded events using the plurality of geotagging data, and labeling each of the plurality of digitally recorded events with their respective determined locations. In some embodiments, the method may further include generating a map showing a trajectory of the mobile device based on the determined locations for each of the plurality of digitally recorded events.

In some embodiments, the method may also include displaying the plurality of digitally recorded events in a time-lapsed video, and displaying the generated map showing the locations of each of the plurality of digitally recorded events in synchronization with the time-lapsed video.

In some embodiments, determining the location of the digital media object is performed on a device other than the mobile device. In some embodiments, determining the location of the digital media object is performed on a device owned by a user who owns the mobile device. In some embodiments, determining the location of the digital media object is performed when the mobile device is in an idle state.

In some embodiments, a mobile device is presented. The mobile device may include an event recorder configured to record a digital media object associated with a surrounding environment of the mobile device. The mobile device may also include a receiver configured to obtain at least one geotagging datum, the at least one geotagging datum comprising at least one timing measurement from at least one reference source. The mobile device may also include a processor configured to determine a location of the digital media object using the at least one geotagging datum, wherein the processor is capable of determining the location of the digital media object by using the at least one geotagging datum while the mobile device is at a location different than the location of where the digital media object was recorded, and label the digital media object with the location of the digital media object.

In some embodiments, an apparatus is presented. The apparatus may include mans for recording a digital media object associated with a surrounding environment of the mobile device, means for obtaining at least one geotagging datum, the at least one geotagging datum including at least one timing measurement from at least one reference source, means for determining a location of the digital media object using the at least one geotagging datum, wherein the apparatus is capable of determining the location of the digital media object by using the at least one geotagging datum while the mobile device is at a location different than the location of where the digital media object was recorded, and means for labeling the digital media object with the location of the digital media object.

In some embodiments, a non-transitory processor-readable medium is presented. The non-transitory processor-readable medium may include processor-readable instructions configured to cause a processor to: record a digital media object associated with a surrounding environment of a mobile device, obtain at least one geotagging datum, the at least one geotagging datum including at least one timing measurement from at least one reference source, determine a location of the digital media object using the at least one geotagging datum, wherein the processor is capable of determining the location of the digital media object by using the at least one geotagging datum while the mobile device is at a location different than the location of where the digital media object was recorded, and label the digital media object with the location of the digital media object.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
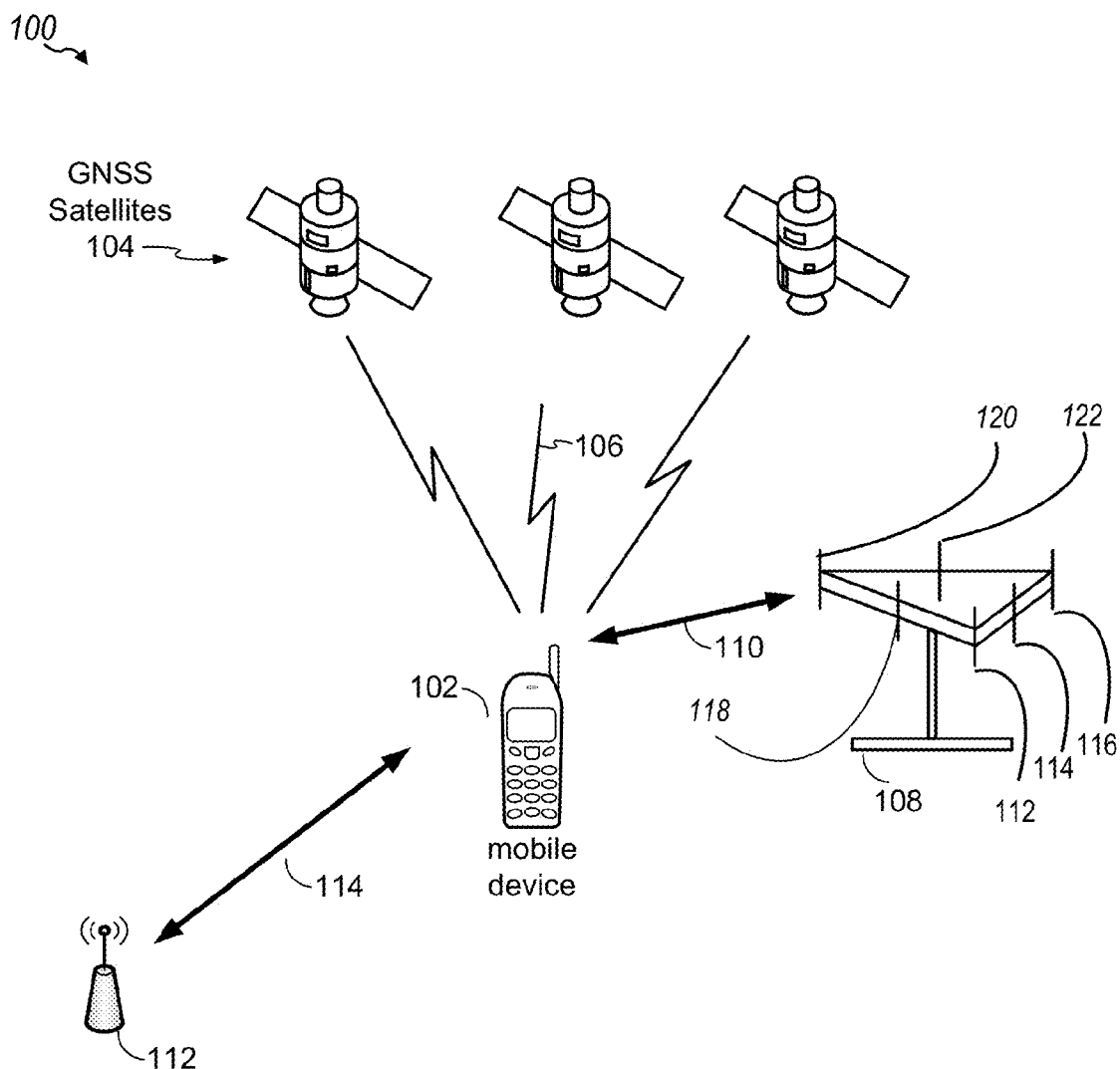
FIG. 1 is an example wireless environment showing several example wireless interfaces according to some embodiments.

The word "exemplary" is used herein to mean "serving as an example, instance, or illustration." Any embodiment or design described herein as "exemplary" is not necessarily to be construed as preferred or advantageous over other embodiments or designs.

As used herein, an "access point" may refer to any device capable of and/or configured to route, connect, share, and/or otherwise provide a network connection to one or more other devices. An access point may include one or more wired and/or wireless interfaces, such as one or more Ethernet interfaces and/or one or more IEEE 802.11 interfaces, respectively, via which such a connection may be provided. For example, an access point, such as a wireless router, may include one or more Ethernet ports to connect to a local modem or other network components (e.g., switches, gateways, etc.) and/or to connect to one or more other devices to which network access is to be provided, as well as one or more antennas and/or wireless networking cards to broadcast, transmit, and/or otherwise provide one or more wireless signals to facilitate connectivity with one or more other devices. Other examples of access points may include a femto cell or wireless beacon.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA is part of Universal Mobile Telecommunication System (UMTS). Long Term Evolution (LTE) uses E-UTRA. UTRA, E-UTRA, GSM, UMTS and LTE are described in documents from 3GPP. CDMA2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA may have similar performance and overall complexity as those of OFDMA system. SC-FDMA signal may have lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Methods for performing geotagging referencing in both indoor and outdoor environments are presented. Geotagging generally may be referred to as the process of adding geographical identification metadata information to various media, such as digital photographs, videos, etc. A position may be determined according to the geographical metadata, allowing the media to be associated with the position identified by the geotagging. For example, various social media websites, e.g. Facebook®, Flickr®, etc., may use the geotagging to indicate easily where the media was recorded. Often times, geotagging information may be in the form of GNSS coordinates and/or latitude and longitude coordinates. However, because current techniques may rely on geographical information that is most easily obtained outdoors, e.g. using GNSS techniques, geotagging may not be very effective in indoor spaces such as malls, office buildings, and museums. Furthermore, current geotagging techniques may perform geotagging processing contemporaneously when the media is recorded, consuming considerable amounts of time and resources for a mobile device. Techniques that do perform geotagging offline tend to be sent to a remote server, but these techniques may then lose privacy for having to use the remote server.

However, these problems and others may solved with respect to geotagging various media according to some embodiments. For example, in some embodiments, a mobile device may geotag recorded media while indoors, using referencing information obtained in relation to WiFi access points (APs), e.g. WiFi routers, etc. For example, a mobile device may obtain round trip time (RTT) or received signal strength indicator (RSSI) measurements when the media is recorded, where the measurements characterize where the mobile device is in relation to one or more APs. RTT and RSSI measurements may be superior than GNSS measurements for obtaining geotagging information when indoors, because these measurements are derived from APs easily accessible to mobile devices when indoors.

Additionally, in some embodiments, geotagging metadata may be recorded in the mobile device, while the processing may be performed offline, e.g. at the mobile device connected to a personal computer in a post-processing fashion, to reduce the time and resources spent by the mobile device when initially recording the media. Mobile devices may simply capture the geotagging information of various APs while recording the media, and then compute positions using the geotagging information at a later time.

Furthermore, the position determinations using the geotagging information may be performed by the mobile device or a computer owned by the user in an offline fashion. Such techniques may enhance privacy and/or protect proprietary information by eliminating the need to offload the geotagging information to a third party server or website. For example, the Qualcomm Indoor Positioning System (QUIPS) engine may be used to achieve these effects.

Referring to FIG. 1, wireless environment 100 shows several example wireless interfaces interacting with mobile device 102 and used to obtain and process geotagging metadata according to some embodiments. For example, in some embodiments, mobile device 102 may interface with global navigation satellite system (GNSS) satellites 104. Mobile device 102 may also be referred to as an access terminal (AT), user equipment (UE), mobile station (MS), GNSS receiver, system, subscriber unit, subscriber station, mobile, remote station, remote terminal, user terminal, terminal, wireless communication device, user agent, user device, or, in the case that SUPL is supported, a SUPL Enabled Terminal (SET), and other terms known in the art. Example mobile devices may include cellular phones, wireless tablets, laptops, personal digital assistants (PDAs), smartphones, automobile navigation systems, SETs, cordless telephones, Session Initiation Protocol (SIP) phones, wireless local loop (WLL) stations, any handheld devices having wireless connection capability, a computing device, or other processing device connected to or containing a modem, for example a wireless modem, and the like. The mobile device 102 may be configured to receive GNSS signals via wireless signals 106. Example GNSS satellites may include any satellites from the GPS constellation, GALILEO, GLONASS constellations, and the like. In some embodiments, mobile device 102 may be configured to receive signals from multiple GNSS satellites from multiple satellite constellations.

In some embodiments, a multiple access wireless communication system utilizing a base station 108 may interface with mobile device 102. Base station 108 may also be referred to as a terrestrial base station, base transceiver station, base station server, location server, access point, Node B, Evolved Node B (eNodeB), access point base station, a WiFi access point, a Femtocell, a Home Base Station, a Home Node B, a Home evolved Node B, and other terms known in the art. Base station 108 may include multiple antenna groups, for example, one including 112 and 114, another including 116 and 118, and an additional including 120 and 122. In FIG. 1, only two antennas are shown for each antenna group, however, more or fewer antennas may be utilized for each antenna group. For example, only one or two total antennas may be included or attached to the base station 108. Mobile device 102 may be in communication with antennas 112 and 114, where antennas 112 and 114 transmit information to mobile device 102 over link 110 and receive information from mobile device 102 over link 110. In some embodiments, link 110 may include both a forward link to mobile 102 and a reverse link back to base station 108. In a Frequency Division Duplex (FDD) system, communication links 118, 120, 124 and 126 may use different frequency for communication. For example, the forward link of link 110 may use a different frequency than that used by the reverse link of link 110.

Each group of antennas and/or the area in which they are designed to communicate may be referred to as a sector of the base station. In some embodiments, antenna groups each are designed to communicate to mobile devices in a sector of the areas covered by base station 108.

In some embodiments, the transmitting antennas of base station 108 may utilize beamforming in order to improve the signal-to-noise ratio of forward links for multiple mobile devices. Also, a base station using beamforming to transmit to mobile devices scattered randomly through its coverage may cause less interference to mobile devices in neighboring cells than a base station transmitting through a single antenna to all its mobile devices. In some embodiments, beamforming is not performed.

In some embodiments, mobile device 102 may interface with access points (APs), such as AP 112. In some cases, an access point may include base stations 108 as examples, but in other cases, access points may refer to any device capable of and/or configured to route, connect, share, and/or otherwise provide a network connection to one or more other devices such as mobile device 102. Examples of APs may include any wireless router, any device capable of employing a WiFi network, a hotspot, femtocell, WLAN, and the like. Example APs may interface with mobile device 102 through such common wireless interfaces 114 as defined in any of the IEEE 802.11 standards, though this is just one example. Other air interfaces known in the art may be used to allow mobile 102 to communicate with AP 112, and embodiments are not so limited.

In some embodiments, wireless environment 100 may include any combination of the various wireless means described in FIG. 1. In some embodiments, the wireless means described herein may interface not only with mobile device 102, but also with each other, e.g. GNSS satellites 104 may interface with base station 108, and the like.

Figure 2:
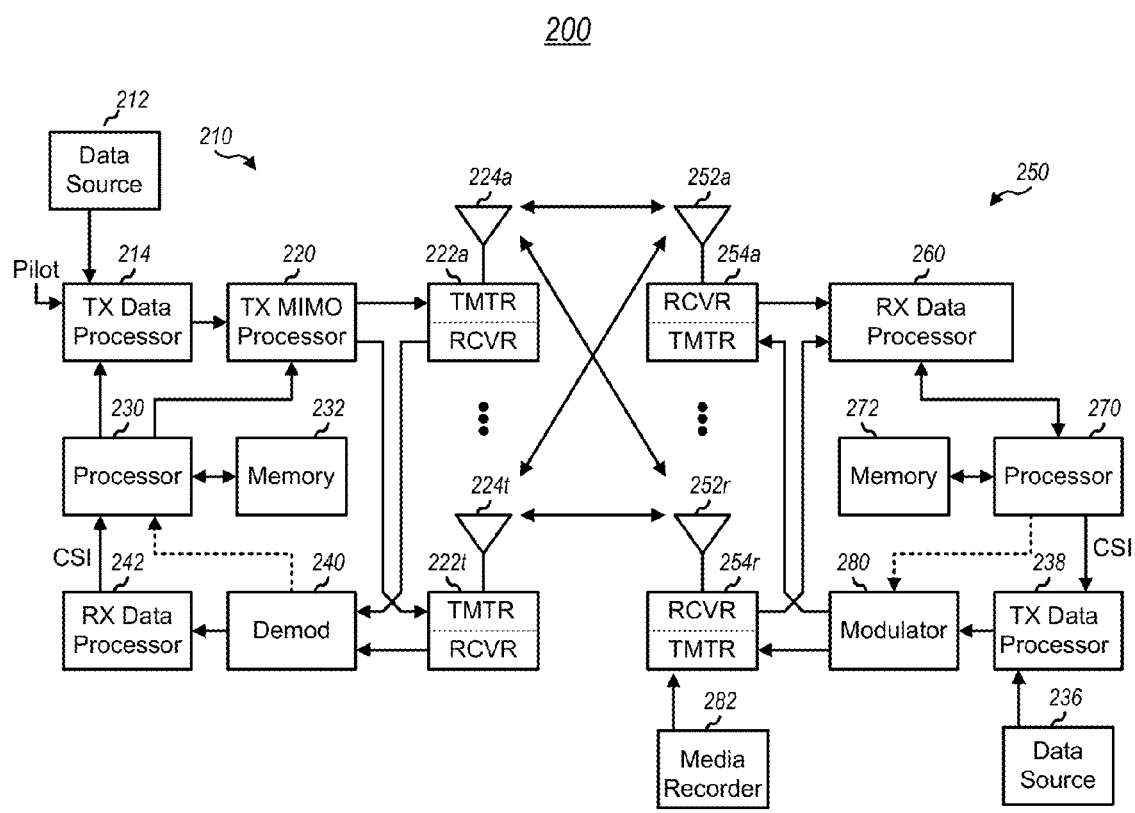
FIG. 2 is an example wireless communications interface including a transmitter system and a receiver system according to some embodiments.

FIG. 2 is a block diagram of an embodiment of a transmitter system 210 (which may, for example, implement the access point 112 or base station 108) and a receiver system 250 (which may, for example, implement the mobile device 102) in a MIMO system 200. It should be noted however, that while an example MIMO system 200 is described, MIMO is not used in some embodiments, as other systems may be used (e.g. SISO, MISO, SIMO, etc.). At the transmitter system 210, traffic data for a number of data streams is provided from a data source 212 to a transmit (TX) data processor 214.

In some embodiments, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream. In some embodiments, media recorder 282 may also be included to receive various forms of digital media, including images, sounds, or text. This media may be processed through RX data processor 260 and processor 270, and ultimately stored in memory 272.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically may determine which precoding matrix to use. Processor 270 may formulate a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210. Two or more receiver, transmitter, and antenna groups may be configured to access separate networks, for example a WLAN network and an LTE, WCDMA, or cdma2000 HPRD network. In some embodiments, a single receiver, transmitter, and antenna group may be configured to access at least two separate networks. Similarly, a plurality of processors may be included to process communications and/or data for a plurality of networks. Further, a single processor may be configured to process communications and/or data for a plurality of networks.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
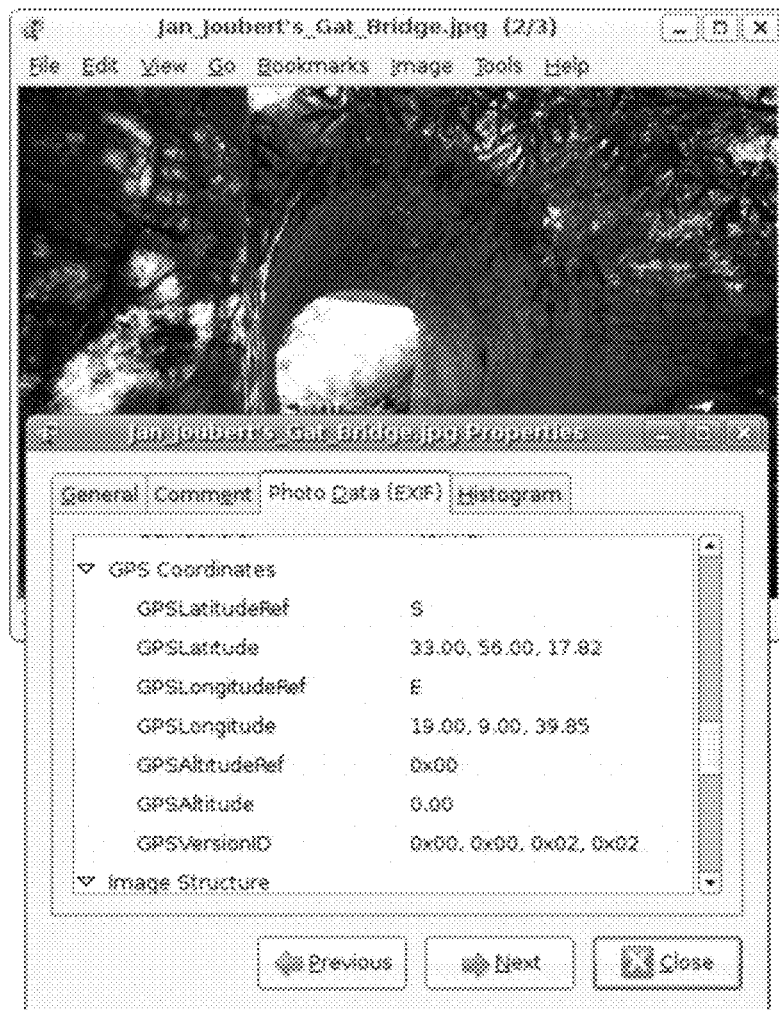
FIG. 3 is an example geotagging illustration according to some embodiments.

Referring to FIG. 3, example illustration 300 shows a series of geotagging metadata that may be obtained according to some embodiments. Generally, geotagging may refer to labeling a picture, video, website, QR code, or other media object with metadata associated with a georeference location of where the media object was recorded. For example, geotagging metadata may include coordinate information sufficient to identify the location of the media object, such as latitude and longitude coordinates. In other cases, altitude, accuracy data, landmark data, or distance data from a reference source may also be included. In other cases, location data expressed as GNSS information, e.g. GPS data, etc., may be used to communicate the location. For example, as shown in exemplary illustration 300, geotagging data may show a location of where the picture was taken, expressed in latitude and longitude. Also shown is the direction the picture was taken, e.g. South and East. Altitude information may also be obtained in some cases.

Currently, a number of websites and products utilize geotagging to provide additional information to viewers of the various media objects. For example, Facebook® allows users post updates and pictures while stating where the post occurred. Numerous websites centering on sharing pictures, such as Flickr®, Instagram®, Picasa®, etc., also utilize geotagging. However, what is common amongst these websites and other geotagging tools is that media objects that are recorded may be immediately tagged with the location, requiring immediate use of the processor of the device uploading the media object. This may be problematic particularly for mobile devices, where reducing any unnecessary operations may be highly valued in order to preserve battery life.

Some traditional methods to reduce battery life usage when performing geotagging may involve uploading the media objects and any geotagging data to a remote server. However, this also can be a problem, for example, if the media objects are proprietary or otherwise not desired to be recorded at any server not owned by the user who is recording the media object. Additionally, the user lacks full control of the media objects, and may require additional processing or other steps in order to transfer the media objects out of the remote server to where the user actually wants to take it.

Figure 4A:
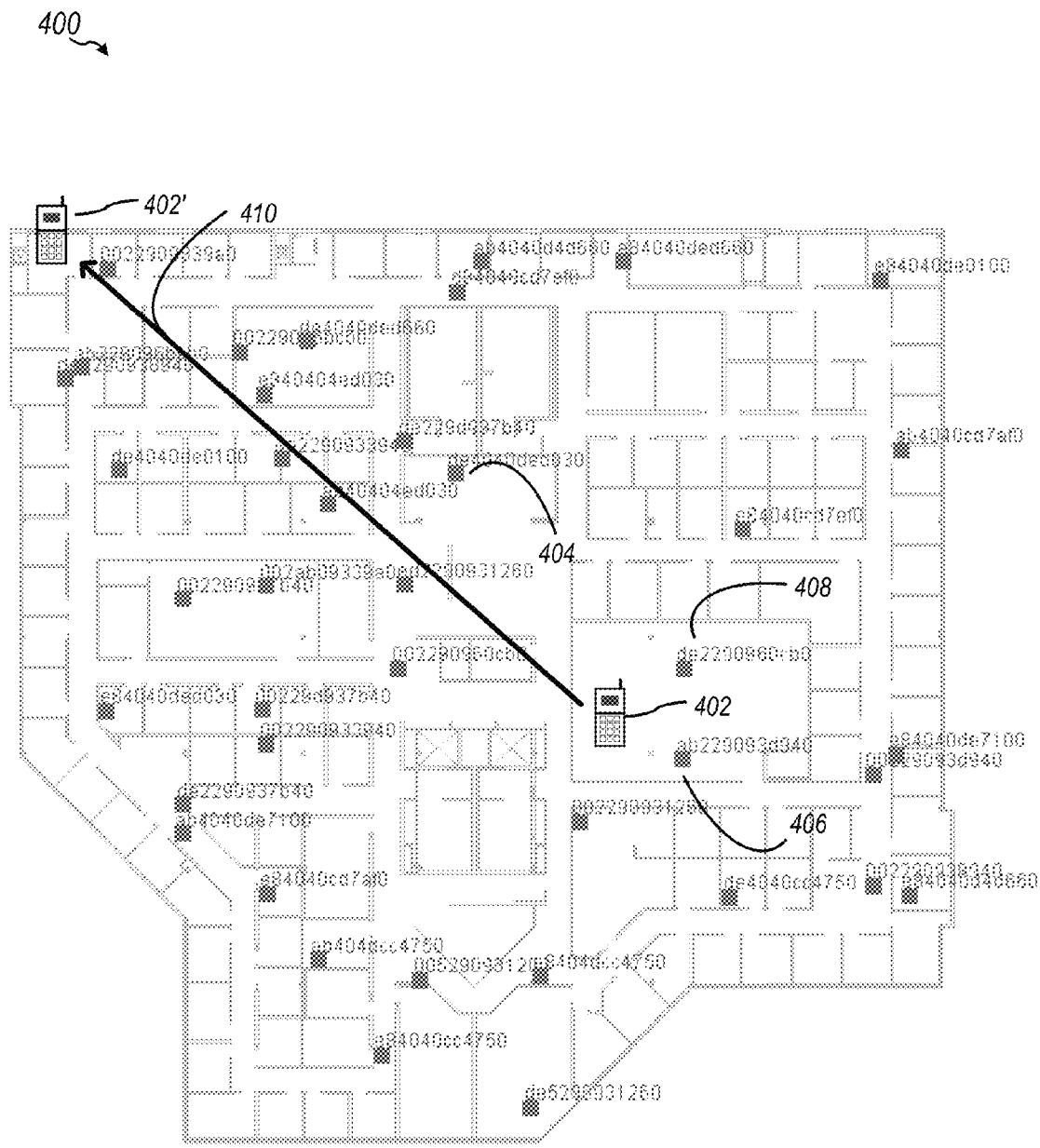
FIGS. 4A and 4B are example scenario of a mobile station performing geotagging processing according to some embodiments.

These problems and others may be solved according to various embodiments. Referring to FIG. 4A, schematic 400 may illustrate an exemplary scenario according to some embodiments. Here, mobile device 402 may be configured to record media objects, e.g. pictures, videos, texts, etc. Mobile device 402 may be located somewhere in the office building as shown in schematic 400. At various locations within the building may be numerous access points (APs), such as AP 404, 406, and 408. Many other APs may be seen that are unlabeled. These APs may be able to provide geotagging data to mobile device 402. For example, any of the APs, including APs 404, 406, or 408, may in communication with terrestrial base stations that can provide GNSS location data. In other cases, the APs may have stored in memory their georeference location, e.g. a latitude and longitude coordinate describing its location. In other cases, the APs may be identified by their MAC ID or other unique identifier, and a database may be referenced to determine what is the location of the AP possessing the particular MAC ID.

Mobile device 402 may collect this data and other timing measurements in order to determine its location when mobile device 402 records a media object. For example, timing measurements may include received signal strength indicator (RSSI) measurements at the mobile device 402 from the APs, or round trip time (RTT) measurements at the mobile device 402 from the APs. Other timing measurements may be used that may enable the mobile 402 to determine its relative time or distance from various APs, and embodiments are not so limited. With knowledge of the stationary location of the APs, and described above, and possession of timing measurements to various APs, the mobile device 402 may be able to determine its own location, thus accurately geotagging any media object it records.

An example implementation to obtain the timing measurements from APs may be described as follows. The mobile device 402 may conduct passive scans for RSSI or using a "lite" QUIPS architecture where some assistance data is received from a server that contains a list of APs to perform request to send (RTS)/clear to send (CTS) scans for RTT measurements. An example process or conducting the RTS/CTS protocol is as follows. First, a passive scan is performed to identify APs that are visible and to get the channel numbers that each AP is operating on. For the APs that are RTT capable, RTS packets are sent and APs acknowledge these using CTS. The RTT of this exchange is determined To know which APs to target for RTT, the mobile device 402 may contact a location or map server and send it the MAC addresses of all visible APs. The server may respond with a lightweight assistance data that includes only the APs that have known locations and for which heatmaps already exist. After receiving this, the mobile device 402 ignores all APs except the ones in the assistance data. The server may or may not determine which floor of a building the user was in at the time of assistance request. For example, if the user were in a 2-story building, the server may send the list of APs on both floors rather than determining the exact floor and sending only the APs there.

If the mobile device 402 is not capable of connecting to a server (lack of data connectivity or other reason), it may choose to perform RTS/CTS with as many visible APs as possible to get RTT measurements. The process of figuring out which APs are to be used for positioning can come at the offline positioning stage when the complete assistance data is downloaded from the server.

In some embodiments, mobile device 402 may simply record any or all of this information at the time of recording the media object, and then the mobile device 402 may perform the actual geotagging of the media object at a later time, using this timing information. For example, at the position shown in schematic 400, mobile device 402 may record a media object, e.g. take a picture with its camera, within the room it is shown in. Mobile device 402 may simultaneously obtain information from the APs, including information sufficient to determine the locations of the APs, as well as timing information to the APs from the mobile device 402. In some embodiments, however, the actual processing used to determine the location of where the media object is recorded may occur at a later place and time. For example, following the arrow 410, mobile device 402 may move to mobile device 402' where, using the aforementioned information obtained earlier, mobile device 402' may perform processing sufficient to determine the location of where the media object was recorded earlier. In some embodiments, mobile device 402' may determine the location of the recorded media object using an offline processing device. In these cases, the assistance data that was downloaded by the mobile device during the recording of the media object, if any, may also be transferred to the offline processing device. If not, the offline device may contact a map server and download the assistance data. This is one implementation. In some embodiments, to get a position fix, the offline device would not only obtain the recorded measurements but also other data such as AP locations, RSSI or RTT heatmaps, floor maps, etc.

Thus, completing the geotagging process of any recorded media object can occur at a time and place more convenient for the mobile device and/or the user. While an office building equipped with various APs is described, in some embodiments, many other environments, whether they be indoors or outdoors, are also possible that allow for a mobile device 402 to record media objects at one location, but enable the mobile device 402' to supply the geotagging of the media object at a different location. The methods described herein may be just one example, but others apparent to those with skill in the art are certainly possible, and embodiments are not so limited.

Additionally, in some scenarios, a user may take numerous pictures throughout a building or other environment, capture just the minimum information necessary to determine the locations later, and then once the picture-taking session is over, return to location that is more suitable to perform all of the geotagging processing. In some scenarios, the mobile device can be connected to a power station, e.g. AC adapter, USB connection, etc., to avoid any concern about lacking power to perform such post-processing. In some scenarios, the mobile device 402 can perform other operations, such as recording sound, transmitting a phone call, playing music, etc., while recording the media objects and not having to immediately conduct the geotagging processing at that point in time. Additionally, poor wireless connections to georeferencing sources using traditional methods may cause the geotagging process to fail. This can be even more problematic when a user desires to record media objects in quick, successive fashion. Thus, advantages of various embodiments may include saving battery life, either in processing or uploading of the media objects, enhancing the efficiency of the mobile device processing, and reducing risk of failing to complete the geotagging process due to insufficient time to obtain a position fix at the mobile device, for example. Moreover, the user also becomes unburdened from having to remember where the media objects were recorded. For example, the processes described herein may also be used for a barcode scanner application, e.g., scanning barcodes of various products. Taking a picture of the product in the store, or the act of scanning the barcode and recording the type of product in the store may be considered recording the media object. At the time of recording, timing measurements to nearby APs may be obtained consistent with the processes described herein, for example. The user may then be able to determine the location of where the product was purchased at any time later.

In some embodiments, the mobile device may invoke a request to a location or map server for assistance data when an event (such as opening a camera or bar code scanner application) happens on the mobile device. In some embodiments, the mobile device may send information about the visible APs (and other transmitters such as Bluetooth® devices) when this server request is invoked. This data may be sent compressed or uncompressed. For example, the mobile device may contact a map server that holds assistance data (e.g., maps, heatmaps etc.) to download the data for the current floor or building the mobile device is located in. This assistance data may be needed if online geotagging is performed. Alternatively, the request to obtain assistance data can be done when offline or deferred tagging is to be done and the mobile device has some free resources to download the data.

In some embodiments, the mobile device may determine when to send requests to a server assisting in performing the geotagging. For example, if the set of currently visible APs intersects with the assistance data received within the last N minutes, the mobile device may not send another request and instead use a cached assistance data. In this way, the mobile device may reduce the number of server requests and data consumption.

Figure 4B:
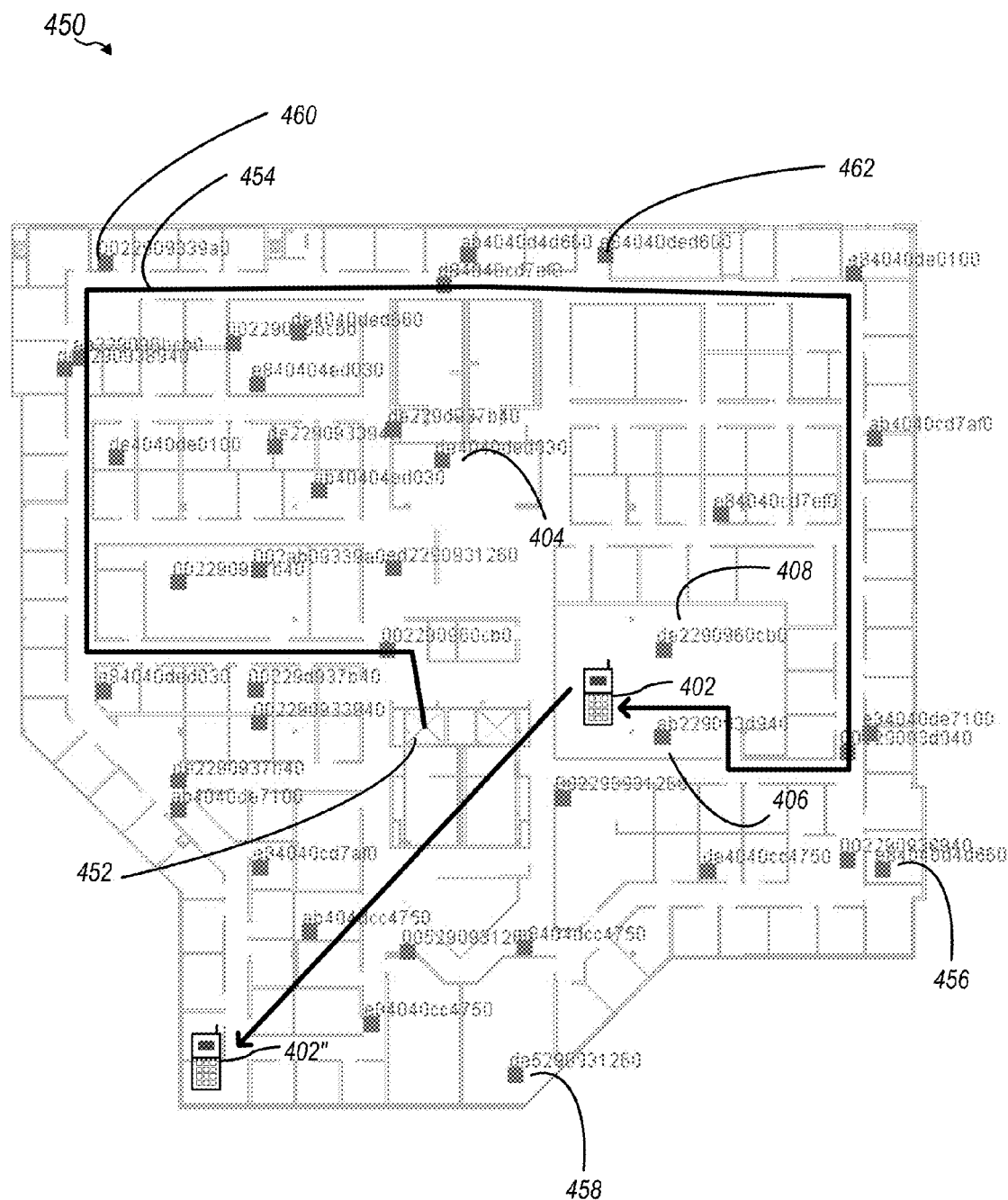

Referring to FIG. 4B, schematic 450 illustrates additional capabilities according to some embodiments. Here, mobile device 402 may be configured to record a continuous, time-lapsed media object, such as a video or sound recording (or both). In some embodiments, geotagging of some or all of the entire time-lapsed media object is possible. For example, starting at elevator 452, mobile device 402 may start recording a video as the user walks around the building in schematic 450. Following the path 454 as shown, the mobile device 402 may record walking along the hallways of the building and ending into the room at the end of path 454. While the video is being recorded, mobile device 402 may also record timing measurements to the various APs in the building. For example, mobile device 402 may record timing measurements to APs 460, 462, 404, 406, 408, 456, and 458. Mobile device 402 may record timing measurements from the same or different APs while recording the media object along path 454, and embodiments are not so limited. In any case, mobile device 402 may also record a unique address of the APs, or a unique location of the APs, as similarly described above with reference to FIG. 4A. In some embodiments, the timing measurements may be recorded at regular intervals along recorded path 454. In some embodiments, the timing measurements may be recorded only when there is a drastic change in the location of mobile device 402.

Using the timing measurements and identification information of the APs, mobile device 402 may comprehensively conduct geotagging processing on the video along path 454. This process may be similar to those described with reference to FIG. 4A, with one difference of course being that multiple timing measurements are taken along a continuous time-lapsed media object. In some embodiments, the geotagging process can be conducted at a location away from where mobile device 402 finishes recording the video, such as at location 402'. Again, this is possible because, unlike traditional geotagging methods, the location of the media object does not need to be immediately determined in order for the location to be recorded. It should be apparent as well that the example scenario described herein advantageously reduces unnecessary battery usage, while additionally optimizes battery usage to focus on recording the video itself.

Various other applications are also possible. For example, in some embodiments, a map following the path 454 of the video may be regenerated and displayed using the timing measurements tagged to various instances of the time-lapsed media object. In some embodiments, while the video is played back, a small window in one corner of the view may display an overhead view of a map, e.g. schematic 450, and a path may be drawn on the map in synchronization with the movements in the video. For example, one can imagine the path 454 being drawn in a small display window in synchronization in time with seeing the actual video of what was recorded while traveling on path 454. This type of application may be beneficial when touring model homes, conducting tours in museums, utilizing robots in dangerous environments, and many other applications apparent to those with skill in the art.

While many of the present descriptions focus on application to a mobile device, in some embodiments, a server may be included that focuses on transmitting information related to visible APs to the mobile device in order to assist in the geotagging process. For example, in some embodiments, a server may process a request from a mobile device and determine candidate buildings and floors of buildings where APs are present. The server may generate a lightweight or small file-sized assistance data file that contains APs that the mobile device should target to obtain timing measurements, for example. In some embodiments, the server may provide the mobile device descriptions of the capabilities of the APs, e.g. whether they are RTT-capable, or RSSI-capable, or the like. In some embodiments, the server may assist the mobile device in computing the locations of the recorded media objects without needing to receive the actual media objects themselves. For example, only the recorded timing measurements and associated AP information may be uploaded to the server, wherein the server may transmit back the computed location of the mobile device. In this way, the recorded media objects may remain exclusive to the user of the mobile device.

Figure 5A:
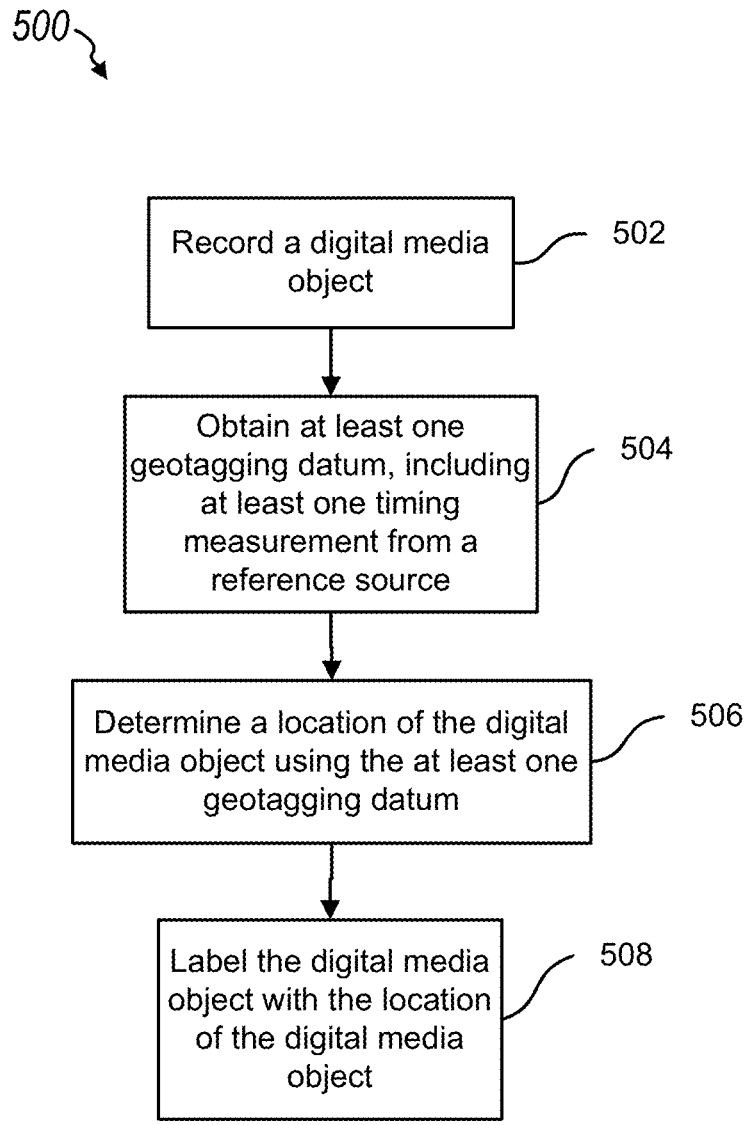
FIGS. 5A and 5B are exemplary flowcharts showing methods of some embodiments.

Referring to FIG. 5A, flowchart 500 represents an exemplary methodology according to some embodiments. Starting at block 502, a mobile device may record a digital media object. The media object may be associated with a surrounding environment of the mobile device. Examples may include a picture, a video, a text, a sound recording, some combination thereof or the like. Block 502 may be implemented through, for example, transceiver 252 or media recorder 282.

At block 504, the mobile device may obtain at least one geotagging datum, including at least one timing measurement from a reference source. The geotagging datum may include forms consistent with any of those described herein, including, for example, latitude and longitude coordinates, GNSS coordinates, and the like. The at least one timing measurement may include forms consistent with any of those described herein, including, for example, RTT and RSSI measurements. Example reference sources may include APs, satellites, base stations, and other sources described in any of FIGS. 1, 2, 3, 4A and 4B. Block 504 may be implemented through, for example, transceiver 252.

At block 506, the mobile device may determine a location of the digital media object using the at least one geotagging datum. In some embodiments, this determination may be performed at a location different than where the digital media object was recorded. Examples of this description may be consistent with those described in FIGS. 4A and 4B. Other examples may include determining the location of the digital media object back at a home residence, at a nearby hotspot with stronger capability for uploading data, at a PC connected to the mobile device, and so forth. In some embodiments, the mobile device may simply be capable of performing the geotagging at a location different than where the media object was recorded. Block 506 may be implemented by, for example, RX data processor 260, processor 270, data source 236 and TX data processor 238.

At block 508, the mobile device may label the digital media object with the location of the digital media object. This step may be consistent with any of the processes described herein for labeling the media object with geotagging data. Block 508 may be implemented by, for example, processor 270 and TX data processor 238.

Figure 5B:
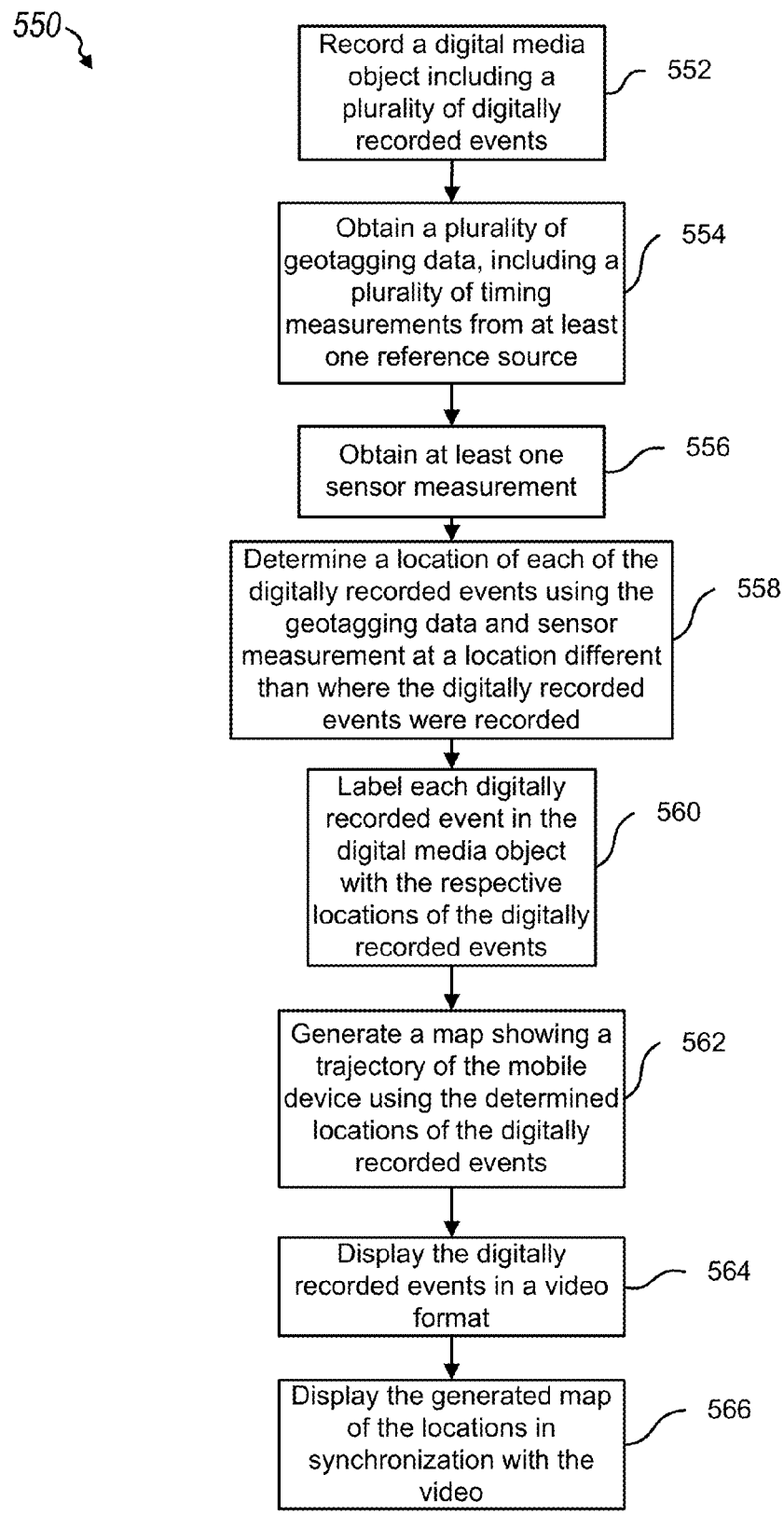

Referring to FIG. 5B, flowchart 550 represents another exemplary methodology according to some embodiments. At block 552, a mobile device may record a digital media object including a plurality of digitally recorded events. In some embodiments, the plurality of digitally recorded events may include a plurality of signals representing sounds or writings. In some embodiments, the plurality of digitally recorded events may include phone calls, barcode scans, digital coupons, email notices, advertisements, and the like. In some embodiments, the plurality of digitally recorded events may be recorded over a period of time, such as in a time-lapsed video. In some embodiments, the plurality digital recorded events may include digital images used to generate the time-lapsed video. Block 552 may be consistent with the descriptions in FIG. 4B, as just one example. Block 552 may be implemented by, for example, media recorder 282.

At block 554, a mobile device may obtain a plurality of geotagging data, including a plurality of timing measurements from at least one reference source. In some embodiments, each of the plurality of timing measurements may be associated with one or some digitally recorded events of the plurality of digitally recorded events. In some embodiments, each of the plurality of timing measurements may be associated with a different one or some of the plurality of digitally recorded events. The geotagging data may include forms consistent with any of those described herein, including, for example, latitude and longitude coordinates, GNSS coordinates, and the like. The plurality of timing measurement may include forms consistent with any of those described herein, including, for example, RTT and RSSI measurements. Example reference sources may include APs, satellites, base stations, and other sources described in any of FIGS. 1, 2, 3, 4A and 4B. Block 554 may be implemented through, for example, transceiver 252.

At block 556, the mobile device may obtain at least one sensor measurement. Example sensor measurements may include accelerometer data, gyro data, cellular measurements, WiMax, Bluetooth®, and the like. The sensor measurements may be used to enhance descriptions of the digital media. The sensor measurements may also provide additional accuracy for determining the position of the mobile device during the media object recording. For example, if the mobile device had a pressure sensor and had managed to calibrate it at a reference altitude, this can make improve the vertical accuracy of positioning. A positioning engine used to determine the location of the mobile device can combine WiFi and sensor measurements to improve the position determinations. Block 556 may be implemented by, for example, transceiver 252. In some embodiments, block 556 is not performed.

At block 558, the mobile device may determine a location of each of the digitally recorded events using the geotagging data and sensor measurement at a location different than where the digitally recorded events were recorded. In some embodiments, the locations may be determined without using the sensor measurements. Block 558 may be consistent with the descriptions in FIG. 4B, as just one example. Block 558 may be implemented by, for example, processor 270, and RX data processor 260.

At block 560, the mobile device may label each digitally recorded event in the digital media object with the respective locations of the digitally recorded events. For example, the labels may be consistent with the descriptions in FIG. 4B. Block 560 may be implemented by, for example, processor 270, RX data processor 260, and TX data processor 238. In some embodiments, blocks 558 and/or 560 may be performed while the mobile device is in an idle state. In other words, the mobile device may be communicatively coupled to an external processor which would be configured to determine the location of the media objects through the memory of the mobile device, for example. In other cases, the mobile device may simply passively perform the steps of blocks 558 and 560, in the sense that no active processes, e.g. recording pictures, conveying phone calls, receiving user inputs, etc., are running. In this sense, the mobile device may be configured to perform these steps only when resources are available so as to not hinder any processes interfacing with a user.

At block 562, the mobile device may generate a map showing a trajectory of the mobile device using the determined locations of the digitally recorded events. For example, the path 454 of FIG. 4B may be generated for the locations of the digitally recorded events along path 454. The map may be expressed as an overhead schematic view, or may be expressed in other forms apparent to those with ordinary skill in the art, such as in text form, 3-dimensional form, or other variants. Block 562 may be implemented by, for example, processor 270 and TX data processor 238.

At block 564, the mobile device may display the digitally recorded events in a video format. The video format may be of any kind known in the art. In some embodiments, the digitally recorded events may be displayed through other devices, such as a projector screen, television, computer monitor, and the like. The video may be uploaded from the mobile device to any other display, or to an interconnected server or the like. Block 564 may be implemented, for example, by TX data processor 238 and transceiver 252.

At block 566, the mobile device may display the generated map of the locations of block 562 in synchronization with the video of block 564. For example, as described in FIG. 4B, the path 454 may be displayed in a smaller window while the video recorded along the path 454 is displayed. In some embodiments, the synched displays may be shown on devices other than the mobile device. Block 566 may be implemented, for example, by TX data processor 238 and transceiver 252.

In some embodiments, not all of the blocks in flowchart 550 are implemented. For example, in some embodiments, a sensor measurement may not be obtained. In other example, a map showing the trajectory of the mobile device may not be generated. In some embodiments, the order of the blocks described in flowchart 550 may be interchanged or performed in a different order or even simultaneously to other blocks. Embodiments are not so limited.

In some embodiments, the concepts and general processes described in flowchart 550 may be applied to other types of digital media objects, such as sound recordings or writings, or some combination thereof. Thus, the digitally recorded events may include digital sound recordings, writings, and other modes of communication. Embodiments are not so limited.

Figure 6:
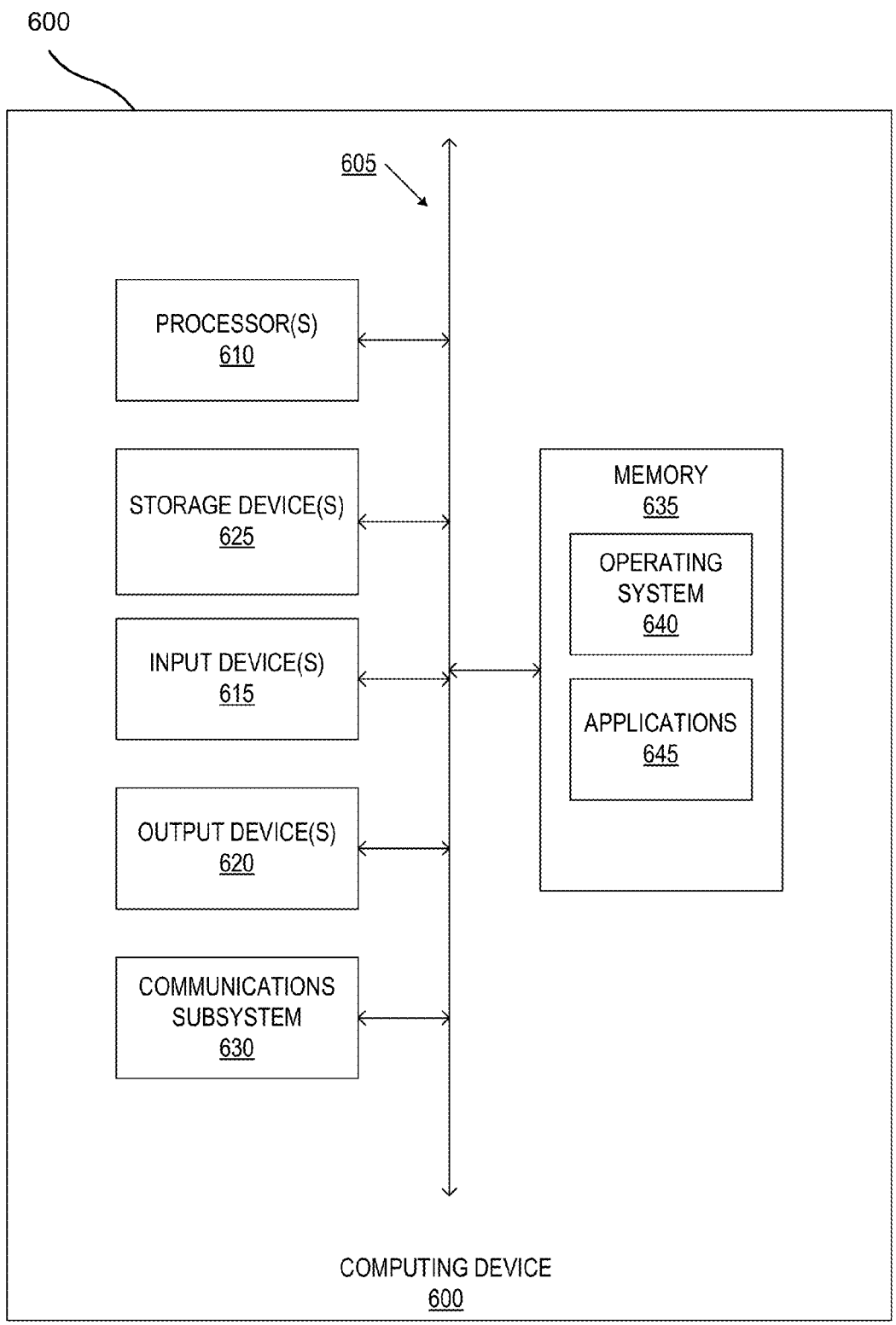
FIG. 6 is an example computer system according to some embodiments.

Having described multiple aspects above, an example of a computing system in which such aspects may be implemented may now be described with respect to FIG. 6. According to one or more aspects, a computer system as illustrated in FIG. 6 may be incorporated as part of a computing device, which may implement, perform, and/or execute any and/or all of the features, methods, and/or method steps described herein. For example, one or more of the processor 610, memory 635, and communications subsystems 630 may be used to implement any or all of the blocks as shown in FIGS. 5A and 5B. For example, computer system 600 may represent some of the components of a hand-held device. A hand-held device may be any computing device with an input sensory unit, such as a camera and/or a display unit. Examples of a hand-held device include but are not limited to video game consoles, tablets, smart phones, and mobile devices. In some embodiments, the system 600 is configured to implement the device 250 described above. For example, processor 610 may be used to implement some or all of Rx data processor 260, processor 270, and Tx data processor 238. Input device(s) 615 may be used to implement some or all of transceivers 252(a)-(r). Memory 635 may be used to implement memory 272, and communications subsystem 630 may be used to implement modulator 280. FIG. 6 provides a schematic illustration of one embodiment of a computer system 600 that can perform the methods provided by various other embodiments, as described herein, and/or can function as the host computer system, a remote kiosk/terminal, a point-of-sale device, a mobile device, a set-top box, and/or a computer system. FIG. 6 is meant only to provide a generalized illustration of various components, any and/or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a camera, a mouse, a keyboard and/or the like; and one or more output devices 620, which can include without limitation a display unit, a printer and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 may further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 5A or 5B, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein, for example one or more of the elements of the method described with respect to any of FIG. 5A or 5B.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communications subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. These and other examples are within the scope of the following claims.

What is claimed is:

1. A method of a mobile device, the method comprising:
   recording, by the mobile device, a digital media object associated with a surrounding environment of the mobile device;
   obtaining, by the mobile device at a first time while the mobile device is at a first location, at least one geotagging datum, the at least one geotagging datum comprising at least one timing measurement from at least one reference source;
   determining a location of the digital media object by processing the at least one geotagging datum at a second time, while the mobile device is at a second location and the mobile device is in an idle state; and
   labeling the digital media object with the location of the digital media object.

2. The method of claim 1 wherein the location of the digital media object is determined while the mobile device is connected to an external power source.

3. The method of claim 1 wherein obtaining the at least one geotagging datum comprises recording the at least one timing measurement from an access point (AP) in range of and identifiable to the mobile device at the time of the recording of the digital media object.

4. The method of claim 3 wherein the at least one timing measurement comprises WiFi received signal strength indicator (RSSI) measurements or round trip time (RTT) measurements.

5. The method of claim 1 wherein the at least one reference source comprises an access point (AP), a base station, or a satellite.

6. The method of claim 1 further comprising:
   obtaining at least one sensor measurement at the mobile device, and
   labeling the digital media object further with the at least one sensor measurement.

7. The method of claim 6 wherein the at least one sensor measurement comprises an accelerometer measurement, a gyro measurement, a Bluetooth measurement, a WiMax measurement, a barometer measurement, a magnetic sensor measurement, or a cellular measurement from the mobile device.

8. The method of claim 1, wherein:
   the digital media object comprises a plurality of digitally recorded events,
   the at least one geotagging datum comprises a plurality of geotagging data, the plurality of geotagging data comprising a plurality of timing measurements from the at least one reference source, wherein each of the plurality of timing measurements is associated with a time at which one of the plurality of digitally recorded events was recorded, the method further comprising:
   determining a location for each of the plurality of digitally recorded events using the plurality of geotagging data; and
   labeling each of the plurality of digitally recorded events with their respective determined locations.

9. The method of claim 8, further comprising:
   generating a map showing a trajectory of the mobile device based on the determined locations for each of the plurality of digitally recorded events.

10. The method of claim 9, further comprising:
    displaying the plurality of digitally recorded events in a time-lapsed video; and
    displaying the generated map showing the locations of each of the plurality of digitally recorded events in synchronization with the time-lapsed video.

11. The method of claim 1, wherein determining the location of the digital media object is performed by a device other than the mobile device.

12. The method of claim 2, wherein determining the location of the digital media object is performed by a device owned by a user who owns the mobile device.

13. A mobile device comprising:
    an event recorder configured to record a digital media object associated with a surrounding environment of the mobile device;
    a receiver configured to obtain at least one geotagging datum at a first time while the mobile device is at a first location, the at least one geotagging datum comprising at least one timing measurement from at least one reference source; and
    a processor configured to:
    determine a location of the digital media object by processing the at least one geotagging datum at a second time, while the mobile device is at a second location and the mobile device is in an idle state; and
    label the digital media object with the location of the digital media object.

14. The mobile device of claim 13 wherein the processor is configured to determine the location of the digital media object while the mobile device is connected to an external power source.

15. The mobile device of claim 13 wherein the receiver is further configured to receive the at least one timing measurement from an access point (AP) in range of and identifiable to the mobile device at the time of the recording of the digital media object.

16. The mobile device of claim 15 wherein the at least one timing measurement comprises WiFi received signal strength indicator (RSSI) measurements or round trip time (RTT) measurements.

17. The mobile device of claim 13 wherein the at least one reference source comprises an access point (AP), a base station, or a satellite.

18. The mobile device of claim 13 wherein the receiver is further configured to obtain at least one sensor measurement at the mobile device, and the processor is further configured to label the digital media object with the at least one sensor measurement.

19. The mobile device of claim 18 wherein the at least one sensor measurement comprises an accelerometer measurement, a gyro measurement, a Bluetooth measurement, a WiMax measurement, a barometer measurement, a magnetic sensor measurement, or a cellular measurement from the mobile device.

20. The mobile device of claim 13, wherein:
the digital media object comprises a plurality of digitally recorded events,
the at least one geotagging datum comprises a plurality of geotagging data, the plurality of geotagging data comprising a plurality of timing measurements from the at least one reference source, wherein each of the plurality of timing measurements is associated with a time at which one of the plurality of digitally recorded events was recorded, wherein the processor is further configured to:
determine a location for each of the plurality of digitally recorded events using the plurality of geotagging data; and
label each of the plurality of digitally recorded events with their respective determined locations.

21. The mobile device of claim 20, wherein the processor is further configured to:
generate a map showing a trajectory of the mobile device based on the determined locations for each of the plurality of digitally recorded events.

22. The mobile device of claim 21, wherein the processor is further configured to:
display the plurality of digitally recorded events in a time-lapsed video; and
display the generated map showing the locations of each of the plurality of digitally recorded events in synchronization with the time-lapsed video.

23. An apparatus comprising:
means for recording a digital media object associated with a surrounding environment of a mobile device;
means for obtaining, at a first time while the mobile device is at a first location, at least one geotagging datum, the at least one geotagging datum comprising at least one timing measurement from at least one reference source;
means for determining a location of the digital media object by processing the at least one geotagging datum at a second time, while the mobile device is at a second location and the mobile device is in an idle state; and
means for labeling the digital media object with the location of the digital media object.

24. The apparatus of claim 23 wherein the means for determining the location of the digital media object are configured to determine the location while the mobile device is connected to an external power source.

25. The apparatus of claim 23 wherein the means for obtaining the at least one geotagging datum comprises means for recording the at least one timing measurement from an access point (AP) in range of and identifiable to the apparatus at the time of the recording of the digital media object.

26. The apparatus of claim 25 wherein the at least one timing measurement comprises WiFi received signal strength indicator (RSSI) measurements or round trip time (RTT) measurements.

27. The apparatus of claim 23 wherein the at least one reference source comprises an access point (AP), a base station, or a satellite.

28. The apparatus of claim 23 further comprising:
means for obtaining at least one sensor measurement, and
means for labeling the digital media object further with the at least one sensor measurement.

29. The apparatus of claim 28 wherein the at least one sensor measurement comprises an accelerometer measurement, a gyro measurement, a Bluetooth measurement, a WiMax measurement, a barometer measurement, a magnetic sensor measurement, or a cellular measurement from the mobile device.

30. The apparatus of claim 23, wherein:
the digital media object comprises a plurality of digitally recorded events,
the at least one geotagging datum comprises a plurality of geotagging data, the plurality of geotagging data comprising a plurality of timing measurements from the at least one reference source, wherein each of the plurality of timing measurements is associated with a time at which one of the plurality of digitally recorded events was recorded, the apparatus further comprising:
means for determining a location for each of the plurality of digitally recorded events using the plurality of geotagging data; and
means for labeling each of the plurality of digitally recorded events with their respective determined locations.

31. The apparatus of claim 30, further comprising:
means for generating a map showing a trajectory of the mobile device based on the determined locations for each of the plurality of digitally recorded events.

32. The apparatus of claim 31, further comprising:
means for displaying the plurality of digitally recorded events in a time-lapsed video; and
means for displaying the generated map showing the locations of each of the plurality of digitally recorded events in synchronization with the time-lapsed video.

33. A non-transitory processor-readable medium comprising processor-readable instructions configured to cause a processor to:
record a digital media object associated with a surrounding environment of a mobile device;
obtain, at a first time while the mobile device is at a first location, at least one geotagging datum, the at least one geotagging datum comprising at least one timing measurement from at least one reference source;
determine a location of the digital media object by processing the at least one geotagging datum at a second time, while the mobile device is at a second location and the mobile device is in an idle state; and
label the digital media object with the location of the digital media object.

34. The non-transitory processor-readable medium of claim 33 wherein the processor-readable instructions are configured to cause the processor to determine the location of the digital media object while the mobile device is connected to an external power source.

35. The non-transitory processor-readable medium of claim 33 wherein the processor-readable instructions are further configured to cause the processor to receive the at least one timing measurement from an access point (AP) in range of and identifiable to the mobile device at the time of the recording of the digital media object.

36. The non-transitory processor-readable medium of claim 33 wherein the at least one reference source comprises an access point (AP), a base station, or a satellite.

37. The non-transitory processor-readable medium of claim 33 wherein the processor-readable instructions are further configured to cause the processor to:
- obtain at least one sensor measurement at the mobile device; and
- label the digital media object with the at least one sensor measurement.

38. The non-transitory processor-readable medium of claim 33, wherein:
- the digital media object comprises a plurality of digitally recorded events,
- the at least one geotagging datum comprises a plurality of geotagging data, the plurality of geotagging data comprising a plurality of timing measurements from the at least one reference source, wherein each of the plurality of timing measurements is associated with a time at which one of the plurality of digitally recorded events was recorded, wherein the processor-readable instructions are further configured to cause the processor to:
- determine a location for each of the plurality of digitally recorded events using the plurality of geotagging data; and
- label each of the plurality of digitally recorded events with their respective determined locations.

39. The non-transitory processor-readable medium of claim 38, wherein the processor-readable instructions are further configured to cause the processor to:
- generate a map showing a trajectory of the mobile device based on the determined locations for each of the plurality of digitally recorded events.

40. The non-transitory processor-readable medium of claim 39, wherein the processor-readable instructions are further configured to cause the processor to:
- display the plurality of digitally recorded events in a time-lapsed video; and
- display the generated map showing the locations of each of the plurality of digitally recorded events in synchronization with the time-lapsed video.

* * * * *